(12) United States Patent
Gatti et al.

(10) Patent No.: US 9,466,039 B2
(45) Date of Patent: *Oct. 11, 2016

(54) TASK ASSIGNMENT USING RANKING SUPPORT VECTOR MACHINES

(71) Applicant: INTERNATIONAL BUSINESS MACHINES CORPORATION, Armonk, NY (US)

(72) Inventors: Maira Athanazio de Cerqueira Gatti, Rio de Janeiro (BR); Ricardo Guimaraes Herrmann, Sao Paulo (BR); David Loewenstern, Hawthorne, NY (US); Florian Pinel, Hawthorne, NY (US); Larisa Shwartz, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,629

(22) Filed: Dec. 8, 2014

(65) Prior Publication Data

US 2015/0095080 A1    Apr. 2, 2015

Related U.S. Application Data

(62) Division of application No. 13/281,912, filed on Oct. 26, 2011, now Pat. No. 8,918,789.

(51) Int. Cl.
*G06F 9/46* (2006.01)
*G06Q 10/06* (2012.01)
*G06N 99/00* (2010.01)

(52) U.S. Cl.
CPC ..... *G06Q 10/063112* (2013.01); *G06N 99/005* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 5,903,641 A | 5/1999 | Tonisson | |
| 6,661,889 B1 | 12/2003 | Flockhart et al. | |
| 6,917,979 B1* | 7/2005 | Dutra | H04L 41/5009 709/207 |

(Continued)

OTHER PUBLICATIONS

Bennett et al. "Support Vector Machines: Hype or Halllujah?", 2000 ACM, pp. 1-12.*

(Continued)

*Primary Examiner* — Van Nguyen
(74) *Attorney, Agent, or Firm* — F. Chau & Associates, LLC (57) ABSTRACT

A method of ranking workers for an incoming task includes recording a list of completed tasks in a computer data structure, extracting first attributes from the list for the tasks that were completed during a pre-determined period, generating a first feature vector for each task and worker from the first extracted attributes, training a Support Vector Machine (SVM) based on the feature vector to output a weight vector, extracting second attributes from an incoming task, generating a second feature vector for each worker based on the second extracted attributes, and ranking the workers using the second feature vectors and the weight vector. The first attributes may be updated during a subsequent period to re-train the SVM on updated first feature vectors to generate an updated weight vector. The workers may be re-ranked based on the second feature vectors and the updated weight vector. Accordingly, the feature vectors are dynamic.

20 Claims, 7 Drawing Sheets

(56) References Cited

U.S. PATENT DOCUMENTS

| | | | |
|---|---|---|---|
| 7,058,589 B1 | 6/2006 | Leamon et al. | |
| 7,464,046 B2 | 12/2008 | Wilson et al. | |
| 7,490,071 B2 * | 2/2009 | Milenova | G06F 17/30595 |
| | | | 706/12 |
| 7,617,164 B2 * | 11/2009 | Burges | G06N 99/005 |
| | | | 706/15 |
| 7,685,077 B2 * | 3/2010 | Li | G06K 9/6231 |
| | | | 706/12 |
| 7,814,048 B2 | 10/2010 | Zhou et al. | |
| 8,069,073 B2 | 11/2011 | Shapiro et al. | |
| 8,209,273 B2 * | 6/2012 | Goris | G06Q 10/06 |
| | | | 706/21 |
| 2003/0097617 A1 | 5/2003 | Goeller et al. | |
| 2008/0021755 A1 | 1/2008 | Jones et al. | |
| 2012/0029968 A1 | 2/2012 | Hada | |
| 2012/0053977 A1 | 3/2012 | Bagheri et al. | |

OTHER PUBLICATIONS

Keerthi et al. "Building Support Vector Machines with Reduced Classifier Complexity", 2006, Journal of Machine Learning Research, pp. 1493-1515.*

Di Lucca, G.A., et al., "An Approach to Classify Software Management Requests", International Conference on Software Maintenance, 2002.

Zanni, Luca, et al., "Parallel Software for Training Large Scale Support Vector Machines on Multiprocessor System", Journal of Machine Learning Research 7 (2006) pp. 1467-1492.

Liu et al., "Dynamic Scheduling of Flexible Manufacturing System Using Support Vector Machines" Proceedings of the 2005 IEEE, International Conference on Automation Science and Engineering, Edmonton, Canada, Aug. 1 & 2, 2005, pp. 387-392.

* cited by examiner

TASK ASSIGNMENT USING RANKING SUPPORT VECTOR MACHINES

CROSS-REFERENCE TO RELATED APPLICATIONS

This application is a divisional of U.S. Pat. No. 8,918,789 filed on Oct. 26, 2011, which is incorporated by reference herein in its entirety.

BACKGROUND

1. Technical Field

The present disclosure generally relates to task assignment, and more particularly to task assignment using ranking support vector machines.

2. Discussion of Related Art

In an increasingly complex and specialized world, human expertise about diverse subjects spanning scientific, economic, social, and political issues plays an important role in the functioning of organizations. Although information technology tools have become indispensable in many environments, organizations continue to rely heavily on human experts' ability to identify and synthesize diverse factors, form judgments, evaluate alternatives, and make decisions.

In multi-domain management, and particularly in service management, new services are continually developed. The provisioning of these services has required increasingly large, complex, and distributed Information Technology (IT) environments, which are supported by people with a variety of expert knowledge in different areas. Due to the reliance on this knowledge, the departure of an expert from an organization may cause an interruption in workflow. The efficiency of managing and utilization of these resources is important to the provisioning of the services. Skills and availability of these resources are an important property of the service.

BRIEF SUMMARY

According to an exemplary embodiment of the present disclosure, a method of ranking workers for an incoming task includes extracting first attributes from a list of tasks that were completed during a pre-determined period, generating a first feature vector for each task and worker from the first extracted attributes, training a Support Vector Machine SVM based on the first feature vector to output a weight vector, extracting second attributes from an incoming task, generating a second feature vector for each worker based on the second extracted attributes, and ranking the workers using the second feature vectors and the weight vector. The method may have initially recorded the list in a computer data structure. The training may include providing scores to the SVM for each corresponding first feature vector.

According to an exemplary embodiment of the present disclosure, a method of training a Support Vector Machine SVM includes recording a list of completed tasks in a computer data structure, extracting attributes from the list for the tasks that were completed during a pre-determined period, generating a feature vector for each task and worker of a plurality of workers from the extracted attributes and a score for each feature vector, and training the SVM based on the feature vectors and their corresponding scores to output a weight vector. The score of the feature vector for a task and a worker that is assigned the task may be higher than the score of the feature vectors for the task for the other workers.

According to an exemplary embodiment of the present disclosure, a method of ranking workers for re-assignment of an incoming task includes extracting first attributes from a list of tasks that were completed during a pre-determined period, generating a first feature vector for each task and worker from the first extracted attributes, training a Support Vector Machine SVM based on the first feature vectors to output a weight vector, extracting second attributes from the incoming task that could not be completed by a current one of the workers, generating a second feature vector for the remaining workers based on the second extracted attributes, and ranking the remaining workers using the second feature vectors and the weight vector. The method may initially include recording the list of tasks in a computer data structure.

According to an exemplary embodiment of the present disclosure, a computer system for ranking workers includes a memory, a processor, and a database. The memory stores a program that is configured to perform the ranking. The processor is configured to execute the program. The database is formatted to store history information of completed tasks. The history information includes a time a task is completed, at least one attribute that describes the task, and a worker identifier that identifies one of the workers that completed the task. The program generates a first feature vector from the attributes of the tasks that were completed during a pre-determined time period, trains a Support Vector Machine with the first feature vector to generate a weight vector, generates second feature vectors for each worker based on attributes of an incoming tasks, and ranks the workers using the weight vector and the second feature vectors.

BRIEF DESCRIPTION OF THE SEVERAL VIEWS OF THE DRAWINGS

Exemplary embodiments of the disclosure can be understood in more detail from the following descriptions taken in conjunction with the accompanying drawings in which.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the present disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The dispatching of tasks to individuals or work groups (teams) with disparate skill sets recurs in various settings. For ease of discussion, embodiments described herein refer to dispatching within a request fulfillment process. Request fulfillment is the process responsible for managing the lifecycle of service requests. Request fulfillment is defined in the Information Technology Infrastructure Library (ITIL) terminology as "management of customer or user requests that are not generated as an incident from an unexpected service delay or disruption". Customer or user requests may be referred to as service requests.

For example, a service desk receives a service request and creates a corresponding ticket. For ease of discussion, embodiments of the present disclosure will be discussed below with respect to IT Service Management, where tickets (service desk tickets) are assigned to technicians. However, embodiments of the present disclosure are not limited to IT, as they can be applied to other fields where tasks are assigned to workers.

A service desk ticket in an IT setting may include a request for various computer related service tasks such as a request to update/install application software, backup a database/flat files, create a user account, add/replace memory, reset a password, reload an operating system, reboot a server, add disk space, troubleshoot a device (e.g., computer, printer, router, etc.), replace/add a device, etc.

The ticket may be handed off to request fulfillment. Request fulfillment comprises management of communication between the requestor and the organization responsible for fulfilling the request, dispatching requests to workers (technicians) with the skills required to resolve the requests, coordination and management of the requests, and the resolution processor itself.

Figure 1:
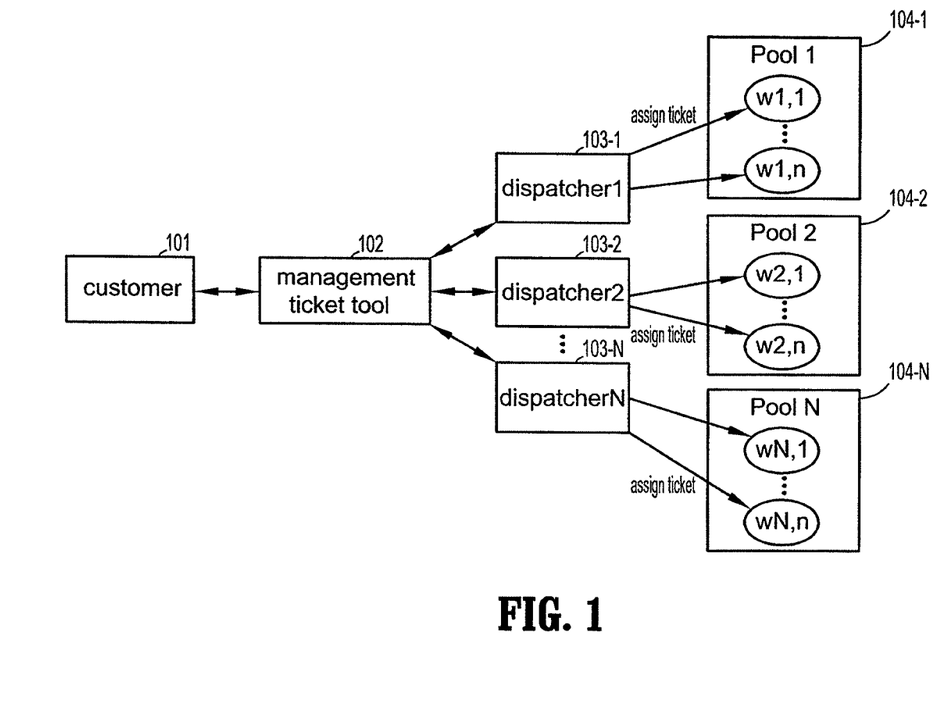
FIG. 1 illustrates a request fulfillment process.

Herein, organizations responsible for fulfilling requests will be referred to as pools. FIG. 1 illustrates a flowchart of a request fulfillment process. For example, FIG. 1 shows how a request from a customer 101 can be fulfilled by one or more pools 104-1, 104-2, . . . , 104-N of workers. The customer 101 makes a request for a service from a management ticket tool 102. The management ticket tool 102 may forward the request to one of the dispatchers 103-1, 103-2, . . . , 103-N based on the type of the service request. For example, network based requests could be forwarded to the first dispatcher 103-1 who has access to the first pool 104-1 of workers that handle network requests and storage based requests could be forwarded to the second dispatcher 103-2 who has access to the second pool 104-2 of workers that handle storage requests. The pools may be grouped into service lines according to the types of the requests for which they are responsible. For example, all pools responsible for managing network tickets, regardless of the source of the ticket, can be considered part of the network service line. While FIG. 1 shows more then one dispatcher, in alternate embodiments, there need be only one dispatcher, which routes the change ticket to the appropriate pool for service. While FIG. 1 shows only a single customer 101, in alternate embodiments, the management ticket tool 102 is configured to handle service requests from multiple customers.

Within the request fulfillment process, a ticket may cause one or more Work Orders (WO) to be created. The WOs represent actual work to be dispatched to a worker (technician), who will may perform the work and therefore fulfill a component of the original request. Dispatching a WO requires an understanding of skill requirements of the requests and knowledge of constraints on fulfillment. These restraints include restrictions on when a request may be fulfilled. The restrictions may be based on customer requirements in the form of Service Level Agreements (SLAs) and schedule commitments of the technicians. SLAs are elements of IT infrastructure services that permit contracts formally detailing a promised service level, clearly delineating quality requirements including the maximum time in which service requests should be handled. Hence, SLAs introduce the notion of urgency to complete the activities associated with each request, bringing a complicating constraint to the dispatching process. The constraints may also include policies addressing cross-training workers, load balancing workers, or reserving high-value workers for higher-value functions such as monitoring.

Matching the skill requirements of the requests to the technician skills may be handled informally by an individual dispatcher who relies on his knowledge of the workers, or it may be formalized into a skill model listing the specific types of skills required for different requests and the skills possessed by the individual technicians. This model can be made more manageable if the requests can be restricted to a specific set of offerings from a service catalog. A service catalog is a list of services that an organization provides, often to its employees or customers. Each service within the catalog typically includes a description of the service, timeframes or a service level agreement for fulfilling the service, who is entitled to request/view the service, costs (if any), instructions on how to fulfill the service, etc.

However, skill requirements and technician competencies may evolve too rapidly for the skill model to remain up-to-date. Further, it may be difficult to construct an accurate skill model since workers are not an unbiased source of information about their own skills. Moreover, many important skills are hard to characterize objectively. For example, many requests require a deep understanding of the specific IT installation associated with a specific customer and so experience with that specific installation may be considered a skill in its own right. In addition, there are often legal restrictions on the use of skill models, since they include information considered private in many jurisdictions.

Accordingly, exemplary embodiments of the present disclosure have the ability to rank a set of workers according to their suitability for receiving the assignment of a request without maintaining an explicit skill model. For example, in at least one embodiment of the present disclosure, a determination of the appropriate worker to perform a given task is made using similarities between the available workers and previous tasks performed by them.

An exemplary embodiment of the present disclosure performs this determination using Machine-Learned Ranking (MLR) (also known as "learning to rank"). MLR is a supervised learning technique for constructing a ranking model from training data, which may be composed of past user choices eliciting their preferences. While some practical applications of MLR are related to information retrieval, it may also be used for constructing a recommender systems and methods, such as those proposed herein.

In MLR, a number of categories are given and a total order is assumed to exist over the categories. Labeled instances are provided, where each instance is represented by a feature vector, and each label denotes a rank. The target value is used to generate pair-wise preference constraints. A Support Vector Machine ("SVM") is an implementation of MLR. A binary classification SVM uses mathematical functions to non-linearly map input vectors to a high dimension feature space so that mapped objects can be separated. The objective of an SVM is to find the weight vector that classifies all the training data correctly and maximizes the distance between a separating hyperplane and the instances. Test samples may be classified according to the complex structures extracted from the training data. Since training an SVM amounts to solving a convex quadratic programming problem, the solution is global and guaranteed to be unique. Binary SVM classifiers may be extended to N-classification problems by training N individual binary classifiers, one for each class, and taking the largest positive distance of a test point as its class. SVMs can also be used in the presence of non-separable training data.

A Ranking SVM learns retrieval functions based on a structural risk minimization framework and can be applied to large datasets. A Ranking SVM differs from a classification SVM in that the objective of the latter is to come up with a binary ordering relation while the former aims at learning a retrieval function that maximizes the expected ordinal (i.e., with respect to features) correlation between this function and the optimal rank. The Ranking SVM approach is suitable when absolute relevance judgments cannot be extracted from the training data, in the sense that elements are not evaluated in relation to every other element.

As discussed above, an embodiment of the present disclosure determines the appropriate worker to perform a given task from similarities between the available workers and the previous tasks performed by them using MLR. For example, an exemplary embodiment of the present disclosure may use a Ranking SVM known as the SVM$^{rank}$ algorithm to perform this determination, which is an implementation of SVM$^{light}$, but is tailored specifically for ranking. Further refinements of this technique include Ranking SVM for Information Retrieval, which presents a way of avoiding training a model biased towards queries with a large number of relevant documents, since the number of relevant documents can vary from query to query. Further, performance of a Ranking SVM can be improved based on a primal Newton method. However, in embodiments of the present disclosure, the number of documents is replaced with the number of workers, which is mostly an unchanging number and typically not such a large number. Accordingly, the SVM$^{rank}$ algorithm is an effective choice.

When an SVM is used to determine the appropriate worker to perform a given task, one needs to define the vector of features which, when multiplied by the vector of weights the SVM calculates, produces a score that reflects a worker's adequateness for the given task. A document is an (almost) invariable entity with a known content, which can be used on its own to determine static features, or in conjunction with a query to compute dynamic features. By contrast, a worker's skills are undocumented and constantly evolving. Indeed, there may be no information about the workers beyond their identifiers and the history of which tickets they had worked on in the past.

Figure 2:
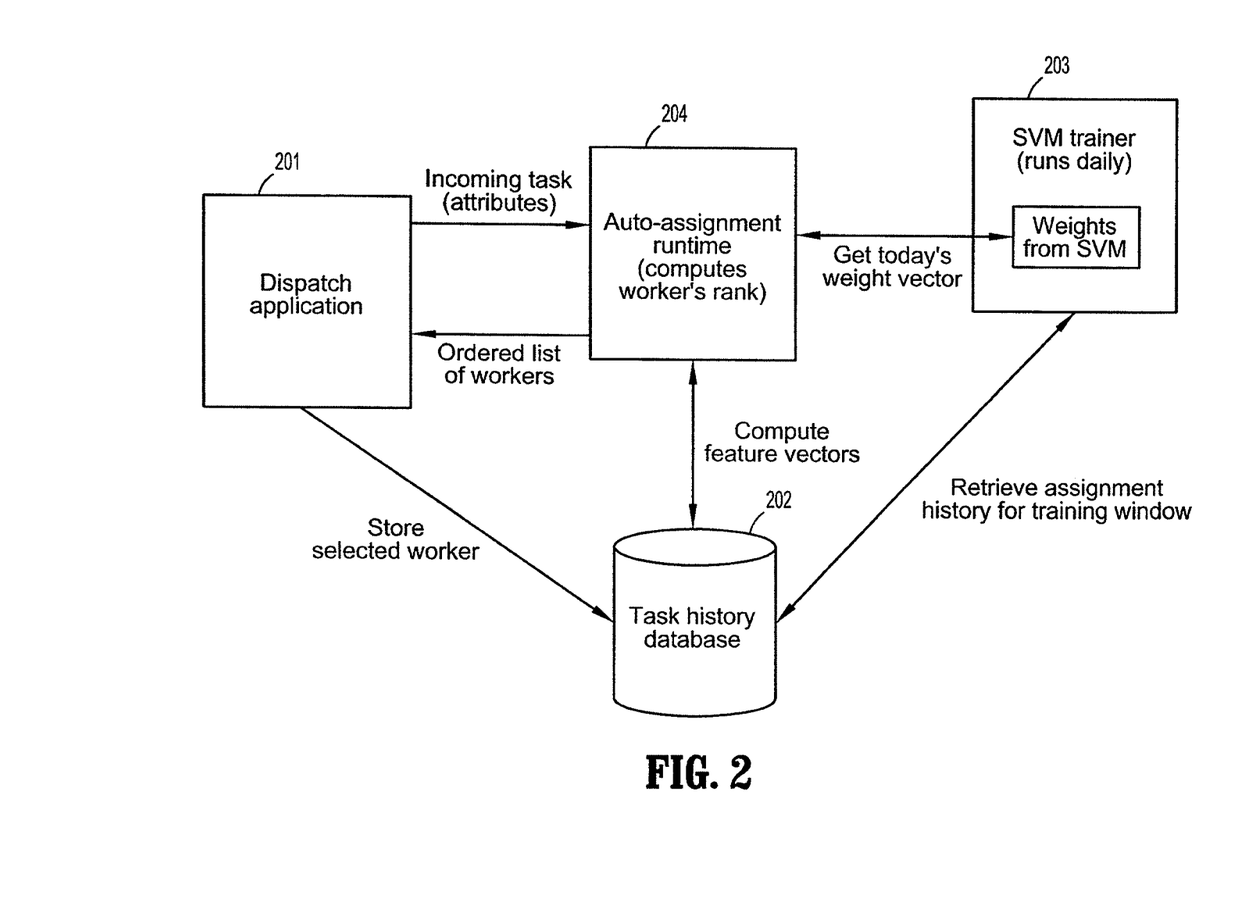
FIG. 2 illustrates a system for ranking workers for performing an incoming task according to an exemplary embodiment of the present disclosure.

FIG. 2 illustrates a system for ranking workers according to an exemplary embodiment of the present disclosure. Referring to the FIG. 2 the system includes a Dispatch Unit 201, a Task History Database 202, an SVM trainer unit 203, and an Assignment Unit 204. The Dispatch Unit 201 stores information about completed tasks or requested tasks in the Task History Database 202.

The information about completed or requested tasks may include at least one of a type of the task, a classification of the task, a requested completion time, an actual completion time, a description of the task, an identifier of the requesting party, a complexity of the task, a priority of the task, a number of identifier of the task, and breach information indicating whether the completed task breached any agreements (e.g., an SLA). For example, the task may have been completed later than specified in terms of the agreement or completed by a party that is not authorized under the terms. The type of the task could indicate that the work is for routine maintenance, development, troubleshooting based on a reported incident, etc.

The information about the completed task may further include a worker identifier of the worker that completed the task. The information about the completed task may further include an indication of whether the task was re-assigned from another worker to this worker.

The information about the requested task may include a worker identifier of the worker that is requested to perform the task. The information about the requested task may further include an indication of whether the requested worker is a re-assignment from another worker.

The Task History Database 202 can be a relational database. For example, each of the above described information can be stored in fields of one or more tables of the relational database. For example, Table 1 below shows an example of one of the tables that may be created.

TABLE 1

| TASK # | TIME | DESCRIPTION | PRIORITY | WORKER |
|---|---|---|---|---|
| 1 | Jul 1, 3:30 pm | Reboot server 1 | 2 | Mary |
| 2 | Jul 1, 5:00 pm | Add disk space to server 2 | 1 | John |
| 3 | Jul 1, 9:30 pm | Add disk space to server 2 | 1 | John |
| 4 | Jul 2, 1:00 pm | Reboot server 3 | 1 | Mary |
| 5 | Jul 2, 2:30 pm | Install application on server 3 | 1 | ? |

As shown by the above Table 1, the first four entries represent completed tasks. For example, each entry includes a task number (e.g., primary key), a time of completion, a description of the task, a priority of the task, and a worker identifier (e.g., first name of worker) of the worker that completed task. The last entry of Table 1 represents an incoming or requested task that has yet to be assigned to a worker. The Task History Database 202 may also represent a non-relational database or unstructured storage.

The SVM trainer unit 203 retrieves history data from the Task History Database 202 for a training window, which is a time period. The training window may be one of various time periods such a 1 hour period, a 1 day period, a 1 week period, etc. The training window may be pre-defined in the SVM trainer unit 203 or read in from a database or other storage device. The SVM trainer unit 203 extracts features from the tasks in the retrieved history data. The SVM trainer unit 203 generates a feature vector for each task and worker based on the features. For each generated feature vector, the SVM trainer unit 203 derives and assigns a score from the history data. For example, the assigned score of a feature vector for a task and a worker originally assigned to the task in the history data may be higher (e.g., 1) than the assigned score of the feature vectors for the task with respect to the other available workers who were not assigned that task in the history data (e.g., 0). The SVM trainer unit 203 generates a weight vector from the feature vectors and their corresponding scores. If the training window is 1 day, the SVM trainer unit 203 would have retrieved all five tasks of Table 1. The SVM trainer unit 203 can perform the retrieval of the history data and the calculation of the weight vector periodically (e.g., daily, hourly, etc.) to generating a dynamically changing weight vector. The weight vector is considered dynamic since the size of the training window and the data of the Task History Database 202 can change.

The feature vectors may be calculated based on various relationships between the various attributes of the history data. In one embodiment, the SVM trainer unit 203 is trained based on a determined number of completed tasks having the same attribute as a requested task that was completed by each worker during the training window. For example, as shown by Table 1 above, the fifth task is the requested task with an attribute of priority 1, there was 1 priority 1 task completed by Mary and 2 priority 1 tasks complete by John within the last 24 hours.

In another embodiment, the SVM trainer unit 203 is trained based on a determined percentage of each workers' workload spent on the tasks having the same attribute as the requested task during the training window. For example, as shown by Table 1 above, Mary spent 50% of her time on priority 1 tasks and John spent 100% of his time on priority 1 tasks.

In still another embodiment, the SVM trainer unit 203 is trained based on a determined percentage of the completed tasks having the same attribute as the requested task that were assigned to a same one of the workers during the window. For example, as shown by Table 1 above, 33.33% of the priority 1 tasks were assigned to Mary and 66.66% of the priority 1 tasks were assigned to John.

However, even though the history data indicates that a worker was previously assigned a task by the dispatcher, it does not necessarily mean that this worker is the most appropriate for this task, since there may be constraints on assignment beyond capability, such as training requirements or worker availability. Indeed, the worker may end up being unable to complete the task in a satisfactory manner. Further, the timeliness of the task completion is another factor that may be considered, as there may be service level agreements specifying maximum resolution times for different kinds of tasks. Furthermore, it can be interesting to examine whether the task is re-assigned to a different worker whose skills are better. Accordingly, in a further embodiment, the Trainer Unit 203 is additionally trained using tasks outcomes. For example, the task outcomes may include (i) completed by the worker (regardless of resolution time), (ii) completed by the worker with a breach of agreement, (iii) re-assigned from the worker to someone else, or (iv) re-assigned from someone else to the worker.

The use of the additional task outcomes can create additional features for a feature vector. For example, if we know tasks are not only completed by particular workers, but have been re-assigned to these workers, features based on both completion and re-assignment may be generated. For example, a feature could be generated that indicates that 30% of the priority 1 tasks completed by worker 1 were re-assigned to that worker or more specifically 10% of the priority 1 tasks completed by worker 1 were re-assigned to that worker from worker 2. In another example, a feature could be generated that indicates the percentage of tasks assigned to a given worker that caused an SLA breach. For example, the feature could indicate that 80% of the tasks assigned to a particular worker in the last day caused a breach.

In another embodiment, the SVM trainer unit 203 is trained to determine which worker should be re-assigned a task that could not be completed by its current assignee. The SVM trainer unit 203 may be trained on completed tasks and/or re-assigned uncompleted tasks. For example, the SVM trainer 203 can be trained based on a determined number of tasks having the same attribute as an uncompleted task that was assigned to or re-assigned to each worker during the training window. In another example, the SVM trainer unit 203 can be trained based on a determined percentage of the tasks having the same attribute as the uncompleted task that were assigned to or re-assigned to a same one of the workers during the window.

The above determined numbers and percentages can be referred to as features. Some or all of these features can be used to generate a feature vector. For example, one or more of the above described embodiments of the SVM trainer unit 203 can be combined. In a further embodiment, the SVM trainer 203 is run during a second window after the original window to generate additional features with are combined with the original features to generate an updated feature vector. The original window and the second window may differ in length (e.g., time period) from one another.

The resulting feature vector may be only features based on (a) the categorizations by the windows or features based on both (b) the categorizations by the windows and the task outcomes (e.g., a Cartesian product of the categorizations and the task outcomes).

The SVM trainer unit 203 can be trained on the resulting feature vector to calculate a weight vector for output to the Assignment Unit 204. When the Dispatch unit 201 receives a new requested task, it can forward attributes (e.g., priority, task description, complexity, etc.) of the task to the Assignment Unit 204. The Assignment Unit 204 generates new feature vectors based on the attributes of the new request and each available worker. The new feature vector is generated in a similar manner as the feature vectors that were generated for training the SVM trainer unit 203. The Assignment Unit 204 may ranks each worker based on the weight vector (from the training) and the new feature vectors. For example, the Assignment Unit 204 can compute a score for each worker by calculating a weighted sum of the features using the corresponding new feature vector of the worker and the weight vector. The resulting scores can be sorted in ascending or descending order to provide an ordered list of the workers.

The Assignment Unit 204 can output the ordered list of the workers to the Dispatch Unit 201. In an alternate embodiment, the Assignment Unit 204 outputs only the highest ranked worker for the requested task. For example, the Dispatch Unit 201 can forward the task request to the highest ranked worker for subsequent completion. In another embodiment, the Assignment Unit 204 outputs the lowest ranked worker to a supervisor for possible discipline.

The SVM features that reflect the percentage of a worker's workload spent on tasks similar to an incoming task and the SVM features that reflect the percentage of tasks similar to an incoming task that were assigned to a worker will be described mathematically below. Note that the other features listed above may be described mathematically in a similar manner.

For a set of workers W and a set of tasks T, if D represents the time dimension let $t(\theta): T \rightarrow D$ be the time when task $\theta$ occurred. The task outcome can be defined as $O=\{o_1, o_2, \ldots, o_m\}$. As discussed above, examples of outcomes are the task completion on-time or the re-assignment. Task categorizations $C=\{C_1, C_2, \ldots, C_n\}$ can be chosen, which represent one or more of the above described task attributes (e.g., priority, work type, etc.). For $1 \le j \le n$, $c_j(\theta): T \rightarrow Cj$ is the value that $C_j$ belongs to. For instance, if $C_1$ represents task priority and $\theta$ is a priority 1 task, then $c_1(\theta)=1$. Next, a set of training windows $L=\{l_1, l_2, \ldots, l_p\}$ is selected, where each value is a time period (e.g., 12 hours, 24 hours) before the current task request (e.g., current ticket) that should be taken into account to compute the features.

With these notations in place, $T_{i,j,k}(w,c,t): W \times C_j \times D \rightarrow N$ is the number of tasks assigned to worker w in the $[t, t-l_i]$ timeframe (training window) and with value c for category $C_j$, whose outcome is equal to $o_k$ (e.g., the number of priority 1 tasks assigned to a worker in the past 24 hours). The features $f_{i,j,k}(w, \theta)$ that reflect the percentage of a worker w's workload spent on tasks similar to task $\theta$ is defined by the following Equation 1:

$$f_{i,j,k}: W \times T \rightarrow [0, 1], \quad \text{[Equation 1]}$$
$$f_{i,j,k}(w, \theta) = \frac{T_{i,j,k}(w, c_j(\theta), t(\theta))}{\sum_{c \in C_j} T_{i,j,k}(w, c, t(\theta))}.$$

The features $f'_{i,j,k}(w, \theta)$ that reflect the percentage of tasks similar to task $\theta$ that were assigned to worker w is defined by the following Equation 2:

$$f'_{i,j,k}: W \times T \rightarrow [0, 1], \quad \text{[Equation 2]}$$
$$f'_{i,j,k}(w, \theta) = \frac{T_{i,j,k}(w, c_j(\theta), t(\theta))}{\sum_{w' \in W} T_{i,j,k}(w', c_j, t(\theta))}.$$

In the above equations, the parameter i is between 1 and integer m (e.g., $1 \le i \le m$), the parameter j is between 1 and integer n (e.g., $1 \le j \le n$), and the parameter k is between 1 and integer p (e.g., $1 \le k \le p$). If $o_1$ represents the tasks completed, $C_1$ is the task priority and $l_i$ is equal to 24 hours, incoming task #5 of above Table 1 has features $f_{1,1,1}$ (Mary, 5)=½ since over the past 24 hours, Mary worked on 1 priority 1 task, and she worked on a total of 2 tasks. Further, incoming task #5 of above Table 1 has features $f_{1,1,1}$ (Mary, 5)=⅓ since over the past 24 hours, Mary worked on 1 priority 1 task, and there was a total of 3 priority 1 tasks. The feature vector can be the whole set of $f_{i,j,k}(w, \theta)$ and $f'_{i,j,k}(w, \theta)$ features, or a subset.

Accordingly, exemplary embodiments of the present disclosure make use of an SVM operating over a set of adaptive features to rank workers (technicians) according to their suitability for resolving a particular service request (e.g., a ticket), without the use of an explicit skill model. This approach combines two different adaptive methods at different levels of abstraction: adaptive features, which exploit historical information about specific workers, and a SVM, which looks for regularities in judgments about different workers to determine which features best capture the information a human dispatcher uses to make decisions.

The adaptive features provide summary data about individual workers based on their prior history on similar tickets, with different features making use of different definitions of "similarity" and summarizing different aspects of the histories. This means that the same features can provide different values for the same combination of ticket and worker depending on the previous context of the ticket. The adaptive features provide sensitivity to changes in the workplace, since the features are lightweight (requires little data to be statistically significant) and can operate on a relatively small time window.

The SVM provides optimization and generality. For example, the SVM can be trained against longer time windows and pooled data across tickets from different groups, so long as the groups have similar policies. The SVM provides a set of weights that can be used to combine these features into a score so that workers can be ranked by their suitability for a particular ticket at a particular moment in time.

These aspects and the SVM being highly robust against correlated features, makes it possible to work with large numbers of different adaptive features without requiring long ticket histories for each worker. Further, the same adaptive features can be used across teams operating under different policies, customers, and mixtures of ticket types.

Embodiments of the present disclosure may be applied to other aspects of dispatching beyond matching workers to tasks.

The features discussed above may rely in part upon a previous assignment of the tasks to classifications from a service catalog. This step may be performed manually based primarily on textual abstracts. However, this step may be treated as a text classification problem to automate the process using historical data.

The above-described features may be augmented by information about the availability and workload of the technicians to permit actual assignments to be automated rather than suggested.

Embodiments of the present disclosure have been described above that use historical data rather than an explicit skill model. However, formulation of these embodiments was based on the assumption that a skill model could not be obtained from all locations or could not be kept accurate over time. However, even a snapshot model obtained from a small sample of locations could in principle provide additional information that could be merged with the above-described model to improve accuracy. In particular, training could be greatly enhanced based on knowledge of which workers are considered viable alternatives by the dispatcher. Embodiments of the Ranking SVM described above can handle such information naturally as a partial ordering of potential workers. Further, a more in-depth analysis of the underperforming pools of workers, including the nature of the worker orders, the service lines, and the locations of the workers, can help in tuning the feature selection.

The below discusses a number of methods that can be derived from the above-described description.

Figure 3A:
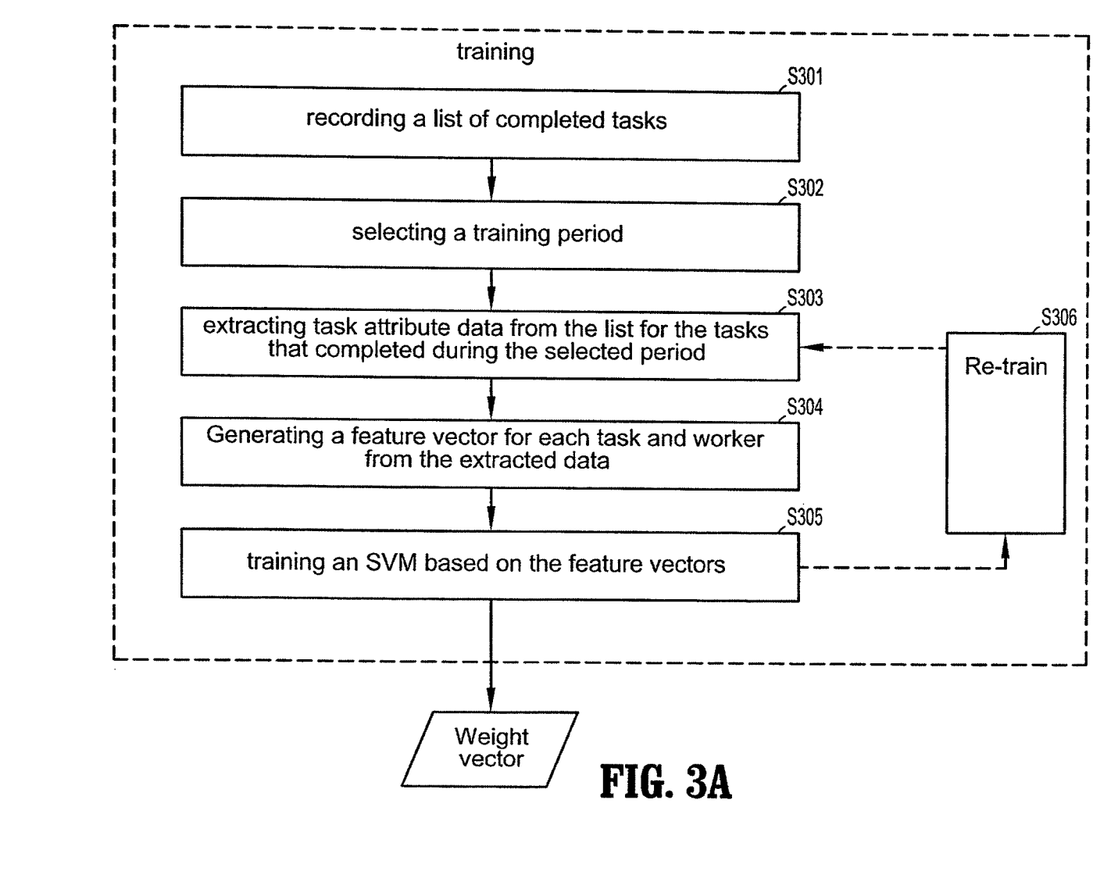
FIG. 3A illustrates a method of training an SVM on completed tasks according to an exemplary embodiment of the present disclosure.
Figure 3B:
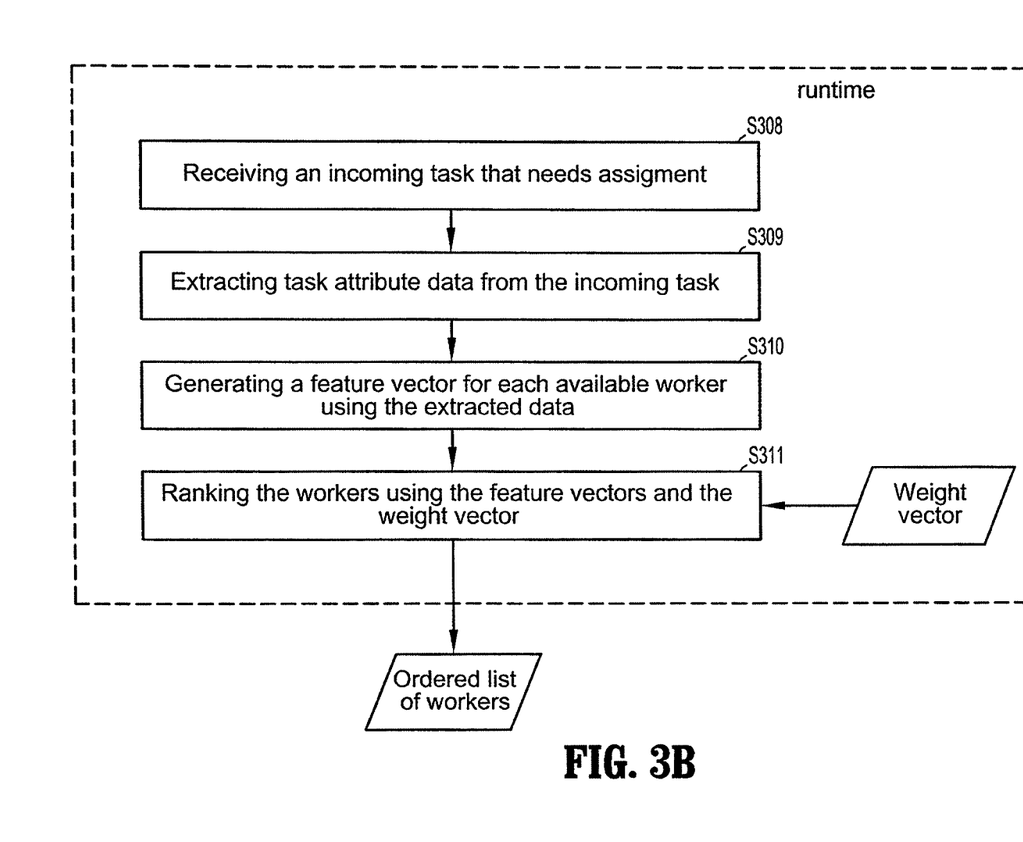
FIG. 3B illustrates a method of ranking the workers for performing the incoming task using an output of the SVM.

FIG. 3A illustrates a method of training an SVM to generate a weight vector according to an exemplary embodiment of the present disclosure. FIG. 3B illustrates a method of using the generated weight to output an ordered list of workers using the weight vector according to an exemplary embodiment of the present disclosure.

Referring to FIG. 3A, the method includes recording a list of completed tasks (S301). For example, the list may be stored within the Task History Database 202. Each entry in the list may include one or more of the above-described attributes (e.g., a task identifier, a task priority, a task description, a completion time, a worker identifier, etc.). The information for the list may be received from a local Dispatch Unit 201 or in a computer generated message or data stream across an electronic network (e.g., internet). For example, a source computer may receive the information from the Dispatch Unit 201 located on a remote target computer. Further, the recording may occur on the remote computer and thus the Task History Database 202 could be located on the remote computer.

Next a training period is selected (S302). For example, the training period can be various periods such as the last hour, day, week, month, etc. The selection of the training period is optional since it may be pre-defined to an initial value. The training period may also be received in a computer generated message or data stream across the electronic network. For example, the source computer may receive the training period from the remote computer.

Next, task attribute data is extracted from the list for the tasks that occurred during the selected period (S303). This step can be filtered such that only data from those tasks that were completed on-time or late are extracted. The extraction may be performed using one or more electronic queries. For example, when the Task History Database 202 is a relational database, the queries may be performed using a structured query language ("SQL"). The task attribute data is the data of one or more of the attributes for each task within the selected period. For example, if the attribute is a priority, then the attribute data could be the value of the priority for each of the tasks within the period. If the attribute data is stored in a relational database, each attribute can be a different table field. When the Task History Database 202 is located on the remote computer, the source computer can extract the attribute data using remote database queries. For example, the queries may additionally specify an address of the remote computer (e.g., an Internet Protocol Address, a node name/identifier) and the name of the database to access the attribute data. The attribute data may be sent from the remote computer to the source computer using generated computer messages or datastreams.

Figure 5:
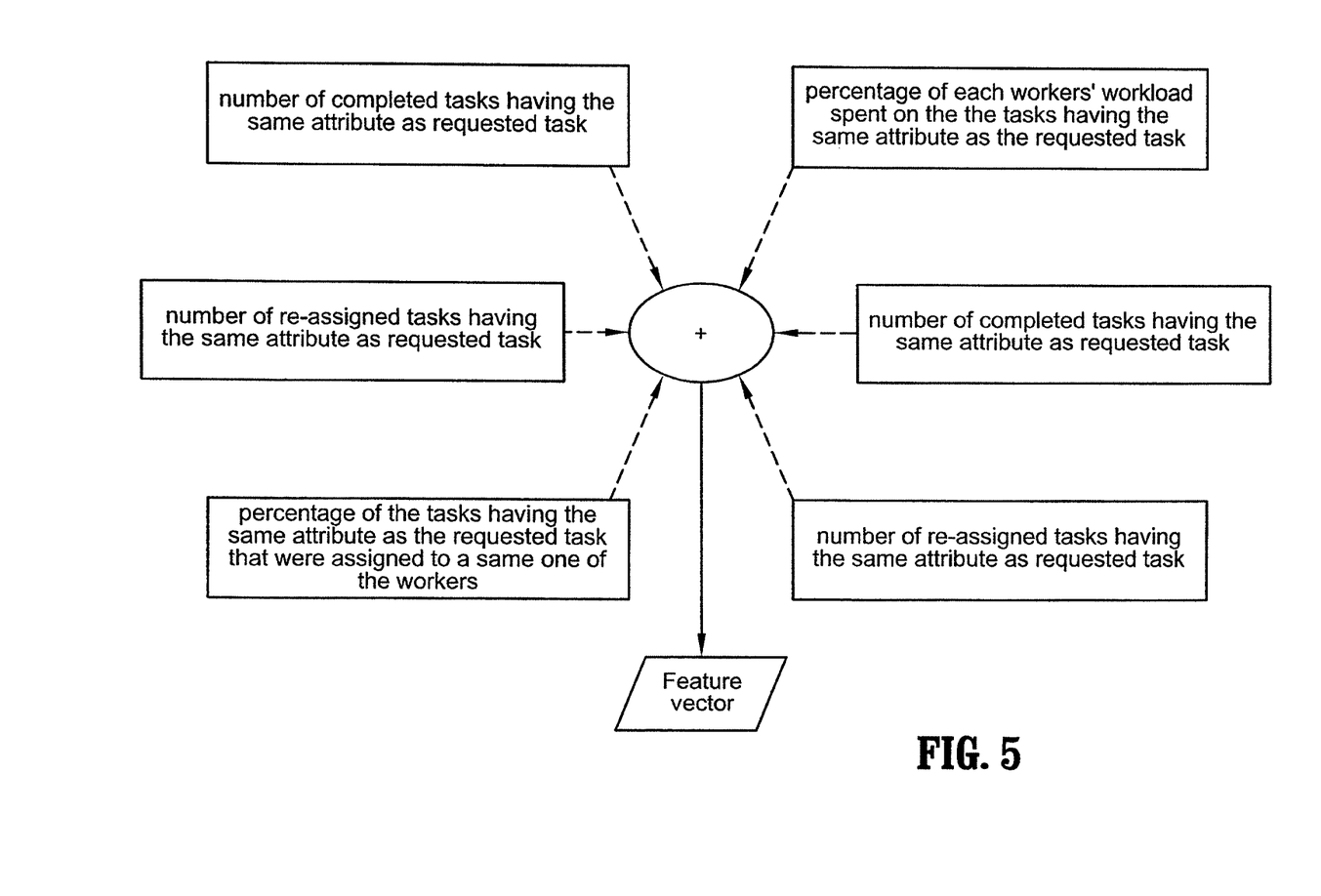
FIG. 5 illustrates examples of features that may be extracted to training the SVM according to exemplary embodiments of the present disclosure.

Next, a feature vector is generated for each task and worker from the extracted data (S304). FIG. 5 shows an example of various features that can be generated from the extracted data, which were described above. As shown in FIG. 5, one or more of the various features can be extracted and then be combined to generate the feature vector.

Referring back to FIG. 3A, an SVM is next trained based on the feature vector to generate a weight vector (S305). The SVM is passed the features vectors and corresponding expected scores. Features vectors that correspond to a task and to a worker that was actually assigned the task may be given a higher score (e.g., 1) than feature vectors that correspond to a task and a worker that was not originally assigned the task (e.g., 0). Further, optionally, the SVM may be retrained periodically to revise the weight vector (S306). For example, the SVM can be re-trained every minute, hour, day, week, month, etc. to generate a new weight vector. Although not shown in FIG. 3A, the training period may be adjusted to a different value prior to the re-training. In an alternate embodiment, the features generated as a result of two or more consecutive training periods are combined into a larger feature vector, which is used to train the SVM to generate the weight vector.

Referring to FIG. 3B, the method receives an incoming task that needs to be assigned to one of the available workers (S308). The incoming task may be received from a local Dispatch Unit 201. The incoming task has similar attribute information to those of the tasks analyzed during the training period. The incoming task may also be received as a computer generated message or datastream by the source computer from the remote computer.

Next attribute data is extracted from the incoming tasks (S309). The attribute data may correspond to the attribute data that was extracted during the training period. For example, if priority information of completed tasks were previously extracting during the training period, the priority of the requested task may be extracted. Next, a feature vector is generated for each available worker using the extracted data (S310). The workers may be ranked based on their feature vectors and the weight vector output during training (S311). An ordered list of the workers based on the rankings can be output.

Figure 4:
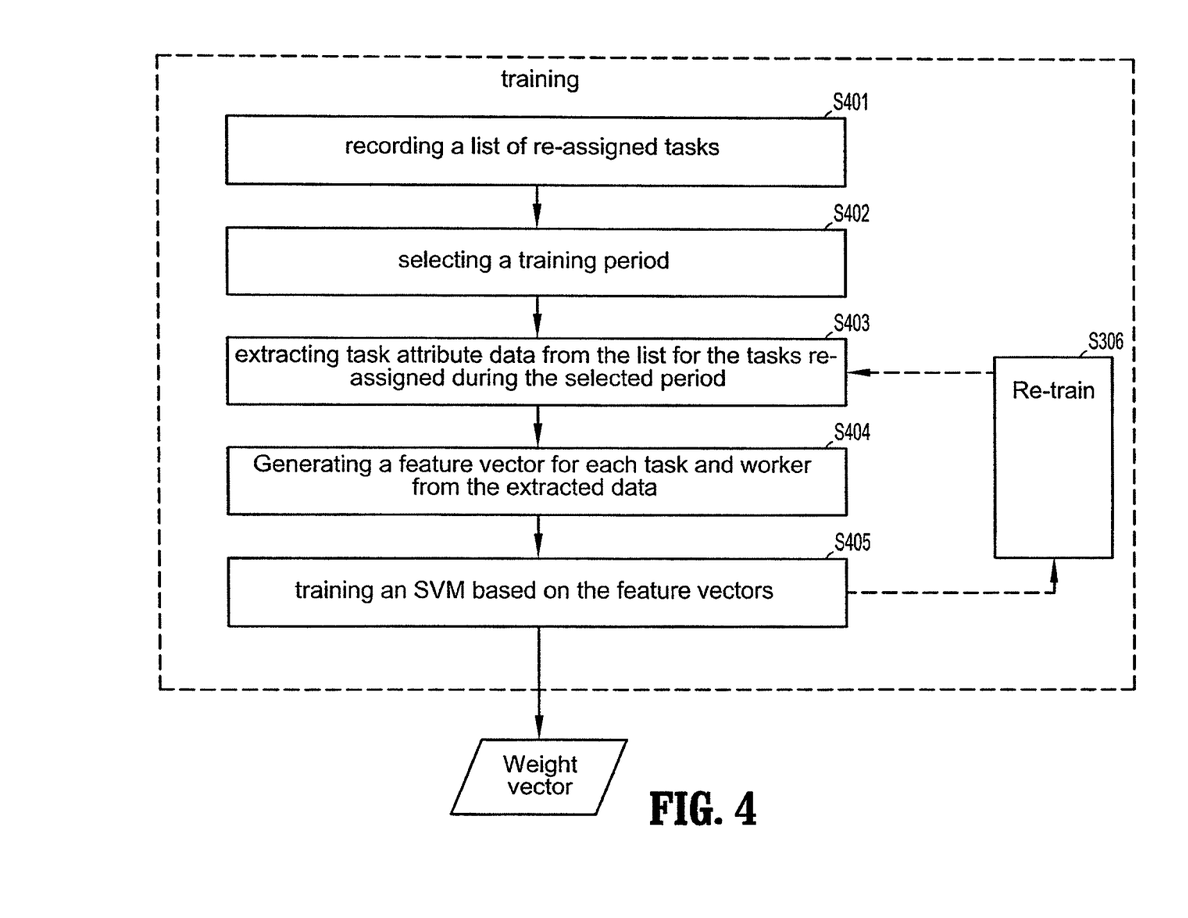
FIG. 4 illustrates a method of ranking the workers for re-assignment of a task according to an exemplary embodiment of the present disclosure.

FIG. 4 illustrates a method of ranking the workers for re-assignment of a task according to another exemplary embodiment of the present disclosure. Referring to FIG. 4, the method includes receiving an incoming task that could not be completed by its current assignee and needs re-assignment (S401), extracting attributes from the incoming task (S402), generating a feature vector for the remaining workers based on the extracted attributes (S403), and ranking the remaining workers using the second feature vectors and the weight vector (S404). The method of FIG. 4 assumes that the training of FIG. 3A has been performed to generate the weight vector.

Figure 6:
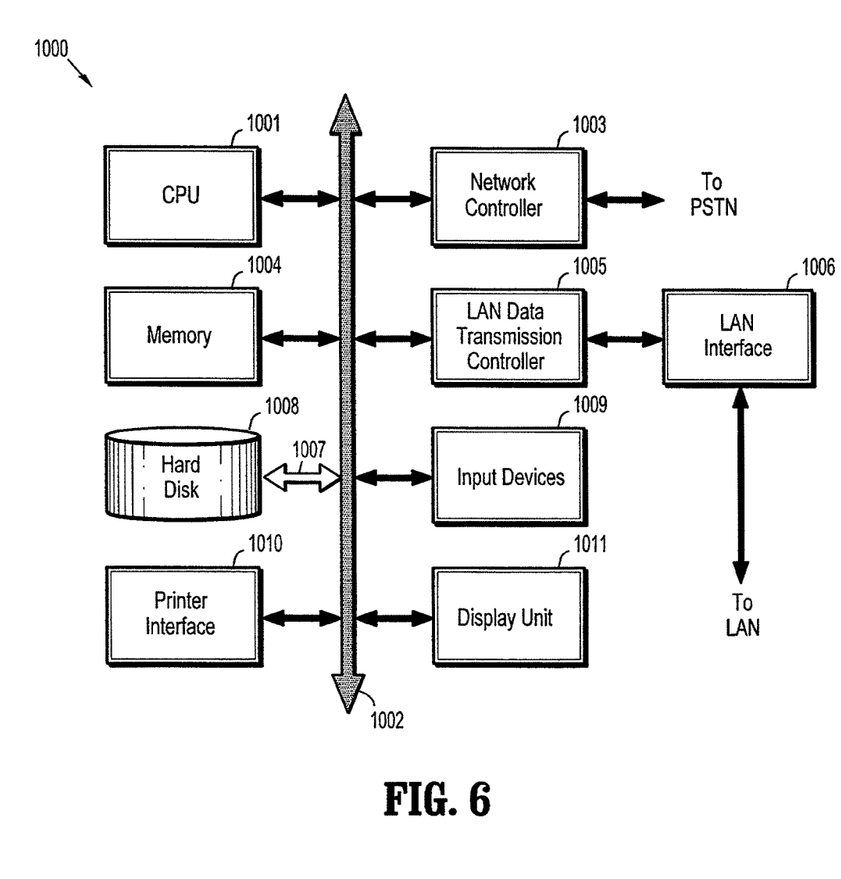
FIG. 6 shows an example of a computer system capable of implementing the methods and systems according to embodiments of the disclosure.

FIG. 6 illustrates an example of a computer system (e.g. the source or remote computer), which may execute any of the above-described methods according to exemplary embodiments of the disclosure. For example, the methods of FIGS. 3A, 3B, and 4 may be implemented in the form of a software application or computer program running on the computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. For example, the LAN interface 1006 may be used to receive the above-described messages from the remote computer or to access the Task History Database 202 when it is located on the remote computer. For example, the display unit 1011 may be used to display the ordered list of workers generated by the Assignment Unit 204 or to enter the information to be recorded in the Task History Database 202. As shown, the system 1000 may be connected to a data storage device, for example, a hard disk 1008, via a link 1007. For example, the Task History Database 202 may be stored in the data storage device. For example, CPU 1001 may be the computer processor that performs the above described methods (e.g., those of FIGS. 3A, 3B, and 4). The computer system may include a hardware or a software timer that is used to periodically re-train the SVM.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of dispatching an incoming task, the method comprising:
    extracting, by a processor, first attributes from a list of tasks that were completed during a pre-determined period by a plurality of workers;
    generating, by a processor, a first feature vector for each task and worker from the first extracted attributes;
    training, by a processor, a Support Vector Machine (SVM) based on the first feature vectors to output a weight vector;
    extracting, by a processor, second attributes from an incoming task;
    generating, by a processor, a second feature vector based on the second extracted attributes;
    ranking, by the processor, the workers for performing the incoming task using the second feature vector and the weight vector, wherein each first feature vector indicates a percentage of each workers' workload spent on the completed tasks having same attributes as the incoming task during the pre-determined period; and
    dispatching the incoming task to a selected worker among the workers with a highest rank determined by the ranking.

2. The method of claim 1, wherein at least one entry in the list comprises a worker identifier, at least one of the first attributes, and a completion time.

3. The method of claim 2, wherein one of the first attributes is a task outcome.

4. The method of claim 2, wherein the task outcome indicates completed with a breach of a Service Level Agreement (SLA) or completed without a breach of the SLA.

5. The method of claim 2, wherein the task outcome indicates completed on-time or completed late.

6. The method of claim 2, wherein the task outcomes indicates reassignment of the corresponding task to one of the workers from another one of the workers.

7. The method of claim 1, further comprising:
generating a score for each first feature vector based on whether the corresponding task was assigned to the corresponding worker; and
training the SVM based additionally on the scores.

8. The method of claim 1, wherein the attributes include at least one of (i) a priority of the task, (ii) a level of complexity of the task, (iii) a task type, (iv) a customer identifier, or (v) description of the task.

9. The method of claim 1, further comprising:
extracting third attributes from the list for the tasks that were completed during a subsequent second pre-determined period;
generating a third feature vector from the third extracted attributes;
training the SVM based on the feature vector and the third feature vector to output a second weight vector; and
re-ranking the workers using the second feature vectors and the second weight vector.

10. The method of claim 9, further comprising: generating a score for each first feature vector based on whether the corresponding task was assigned to the corresponding worker; and training the SVM based additionally on the scores.

11. The method of claim 9, wherein the attributes include at least one of (i) a priority of the task, (ii) a level of complexity of the task, (iii) a task type, (iv) a customer identifier, or (v) description of the task.

12. The method of claim 9, further comprising:
extracting third attributes from the list for the tasks that were completed during a subsequent second pre-determined period;
generating a third feature vector from the third extracted attributes;
training the SVM based on the feature vector and the third feature vector to output a second weight vector; and
re-ranking the workers using the second feature vectors and the second weight vector.

13. The method of claim 1, wherein the incoming task is a request for a computer related service task and the dispatching comprises a request fulfillment process forwarding the incoming task to the selected worker.

14. A method of dispatching an incoming task, the method comprising:
extracting, by a processor, first attributes from a list of tasks that were completed during a pre-determined period by a plurality of workers;
generating, by a processor, a first feature vector for each task and worker from the first extracted attributes;
training, by a processor, a Support Vector Machine (SVM) based on the first feature vectors to output a weight vector;
extracting, by a processor, second attributes from an incoming task;
generating, by a processor, a second feature vector based on the second extracted attributes;
ranking, by the processor, the workers for performing the incoming task using the second feature vector and the weight vector, wherein each first feature vector indicates a percentage of the tasks having same attributes as the incoming task that were assigned to a same one of the workers during the pre-determined period; and
dispatching the incoming task to a selected worker among the workers with a highest rank determined by the ranking.

15. The method of claim 14, wherein at least one entry in the list comprises a worker identifier, at least one of the first attributes, and a completion time.

16. The method of claim 15, wherein one of the first attributes is a task outcome.

17. The method of claim 15, wherein the task outcome indicates completed with a breach of a Service Level Agreement (SLA) or completed without a breach of the SLA.

18. The method of claim 15, wherein the task outcome indicates completed on-time or completed late.

19. The method of claim 15, wherein the task outcomes indicates reassignment of the corresponding task to one of the workers from another one of the workers.

20. The method of claim 14, wherein the incoming task is a request for a computer related service task and the dispatching comprises a request fulfillment process forwarding the incoming task to the selected worker.

* * * * *